United States Patent
Yousaf et al.

(10) Patent No.: US 10,467,040 B2
(45) Date of Patent: Nov. 5, 2019

(54) INTELLIGENT SELF-CONFIGURING DECISION METHOD FOR THE CLOUD RESOURCES MANAGEMENT AND ORCHESTRATION

(71) Applicant: NEC Laboratories Europe GmbH, Heidelberg (DE)

(72) Inventors: Faqir Zarrar Yousaf, Leimen (DE); Vincenzo Sciancalepore, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 72 days.

(21) Appl. No.: 15/949,116

(22) Filed: Apr. 10, 2018

(65) Prior Publication Data
US 2019/0102213 A1    Apr. 4, 2019

Related U.S. Application Data

(60) Provisional application No. 62/565,168, filed on Sep. 29, 2017.

(51) Int. Cl.
| | |
|---|---|
| G06F 9/455 | (2018.01) |
| G06N 5/04 | (2006.01) |
| H04L 12/24 | (2006.01) |
| H04L 12/26 | (2006.01) |
| G06F 11/30 | (2006.01) |

(52) U.S. Cl.
CPC ......... *G06F 9/45558* (2013.01); *G06F 11/30* (2013.01); *G06N 5/04* (2013.01); *H04L 41/147* (2013.01); *H04L 43/06* (2013.01); *G06F 2009/4557* (2013.01); *G06F 2009/45591* (2013.01); *G06F 2009/45595* (2013.01)

(58) Field of Classification Search
None
See application file for complete search history.

(56) References Cited

FOREIGN PATENT DOCUMENTS

WO    WO 2017088905 A1    6/2017

OTHER PUBLICATIONS

ETSI GS NFV-MAN 001 V1.1.1 (Dec. 2014), "Network Functions Virtualisation (NFV); Management and Orchestration", Dec. 2014, pp. 1-184.
ETSI GR NFV-IFA 021 V3.1.1 (Jan. 2018), "Network Functions Virtualisation (NFV) Release 3; Management and Orchestration; Report on management of NFV-MANO and automated deployment of EM and other OSS functions", Jan. 2018, pp. 1-57.

*Primary Examiner* — Gregory A Kessler
(74) *Attorney, Agent, or Firm* — Leydig, Voit & Mayer, Ltd.

(57) ABSTRACT

According to an embodiment of the invention, a method is provided for reducing the monitored-data load and the processing load/delay on a cloud management system (CMS). The method includes applying a prediction process to provide predicted key performance indicator (KPI) values for a plurality of VMs managed by the CMS during a first monitoring epoch; collecting, during the first monitoring epoch, observed KPI values for the plurality of VMs managed by the CMS; assessing the accuracy of the prediction process by way of calculating, according to a reward function, reward values for the plurality of VMs based on a deviation between the observed KPI values and the predicted KPI values; calculating a monitoring frequency for collecting monitoring information during a second monitoring epoch based on the reward values; and collecting the monitoring information during the second monitoring epoch according to the calculated monitoring frequency.

15 Claims, 10 Drawing Sheets a) Decreasing the number of affinity groups when a VNF profile deviation occurs b) increasing the number of affinity groups as no VNF profile deviations occurred

INTELLIGENT SELF-CONFIGURING DECISION METHOD FOR THE CLOUD RESOURCES MANAGEMENT AND ORCHESTRATION

CROSS-REFERENCE TO PRIOR APPLICATION

Priority is claimed to U.S. Patent Application No. 62/565,168, filed on Sep. 29, 2017, the entire disclosure of which is hereby incorporated by reference herein.

FIELD

The present invention relates to cloud management systems (CMS), and more specifically, to systems and methods for reducing the monitored-data load and the processing load/delay on CMS.

BACKGROUND

Network Function Virtualization (NFV) is widely being considered as one of the key enabling technologies for 5G networks. One of the main motivating factors behind NFV is to provide a technology that will enable the operators and service providers to provide and manage resources and services in an efficient and agile manner with reduced capital expenditures (CAPEX) and operating expenditures (OPEX), reduced new service roll-out time and increased return-on-investment (ROI).

An NFV system consists of Virtualized Network Functions (VNF) that are deployed on servers, which can be referred to as compute nodes, located inside a datacenter. A Cloud Management System (CMS) is an integral part of such a NFV Infrastructure (NFVI) and is responsible for the Management and Orchestration (MANO) of NFVI resources, such as compute nodes, CPUs, network resources, memory, storage, VNFs etc. For effective MANO decisions, a CMS relies on the presence of a reliable and robust monitoring system that monitors the utilization of the NFVI resources and VNF Key Performance Indicators (KPIs) and keeps the CMS updated by the regular provisioning of monitored data and KPIs, e.g., percentage-utilization of specific resource units and/or aggregate resource utilization values of all the VMs in a physical machine, load experienced by individual VMs, etc. The CMS will regularly analyze the monitored data and derive appropriate Lifecycle Management (LCM) decisions. A CMS may have an administrative domain that includes multiple physically separate datacenters. Under such circumstances, the CMS may manage and orchestrate services that span across multiple physically separate datacenters. In order to do so, the CMS relies on monitored data received from each of the multiple physically separate datacenters within the administrative domain.

As part of the MANO operations, a CMS will impart relevant LCM actions on the individual VNFs and/or their underlying resources in order to ensure its operational/functional integrity. LCM actions may include scaling in/out/up/down, migration/placement, update/upgrade, delete etc. of individual VNFs and/or their respective resources. For example, a VNF instance may be scaled whenever load on a VNF increases beyond a specific threshold or a VNF may be migrated to another Physical Machine (PM) (e.g., a server), whenever there are not enough resources available to satisfy the functional and/or operational scope of the VNF. Arriving at the correct LCM decisions is itself an incredible challenge owing to the variety of VNFs that need to be managed inside of an NFVI. The complexity of a VNF may also vary where more complex VNFs may embody a complete system, for example a Virtualized Evolved Packet Core (vEPC) system that is formed of multiple VNF Components (VNFC) interlinked over standard and proprietary Virtual Links (VLs). The example of such a complex VNF is illustrated in FIG. 1. In FIG. 1, a Virtual Mobility Management Entity (vMME) VNF and a Virtual Serving Gateway/Packet Data Network (PDN) gateway (vS/P-GW) VNF are composed of different VNFC interlinked over VLs. Each VNF is allocated a set of resources, and a CMS performs LCM. The LCM tasks include both Service Orchestration (SO) and Resource Orchestration (RO) of the VNFs and their respective underlying resources, both virtualized and physical.

The complexity of MANO operations performed by a CMS further increases as it also needs to manage not only VNFs but also Network Services (NS) that are formed by chaining relevant VNFs, e.g. firewalls, video optimizers, schedulers, virtualized EPCs, etc. If the LCM decisions on actions are not taken with care and deliberation, the LCM actions on one or more resources (e.g., infrastructure resources, VNFs etc.) may have an inadvertent adverse impact on other resource elements that may be relying on the services of the managed resource element and/or sharing the other resources. For example, a migration decision on a VNF belonging to a particular active NS may not only have an adverse impact on the overall Quality of Service (QoS) and/or Quality of Experience (QoE) of the NS itself, but it may also inadvertently impact the QoS and/or QoE of other VNF(s)/NS that may be sharing its resources with the migrated VNF due to resource contention. The QoS and/or QoE degradation of one NS may also impact on the QoS and/or QoE of other NS that were relying on the services offered by that particular NS. The CMS will thus perform a second iteration of LCM actions to rectify from this degraded service situation, and thus it is very much likely for the CMS to run multiple iterations before a stable and optimum situation is achieved. However, it is highly undesirable to run multiple iterations of LCM/orchestration decisions within a short span of time as it results in continuous service interruption thereby impacting the overall QoS/QoE. In other words, the CMS will have a poor Quality of Decision (QoD).

The QoD can be measured in terms of two mutually dependent criteria. First, the QoD can be measured in terms of how resource efficient the management action is. The resource efficiency can be measured in terms of whether both the long term and short term resource requirements of the managed VNF will be fulfilled in the selected compute node and how non-intrusive a management action has been for other VNFs that are already provisioned in the selected compute node. A management action is non-intrusive to the extent that the action does not affect the performance—in terms of resource availability—of other VNFs in the compute node(s) involved in the management action. Second, the QoD can be measured in terms of the number of times the management action has to be executed before the most-suitable compute node is determined to migrate/scale the managed VNF to.

The QoD of the CMS in turn depends on both the quality and quantity of the information that it receives from the monitoring system. The quality depends on the variety of KPIs that are reported to the CMS while the quantity depends on the frequency of updates of the KPIs that the CMS retrieves. Information provided by a monitoring system may include a variety of key-performance indicators (KPI), e.g., percentage-utilization of specific resource units and/or aggregate resource utilization values of all the VNFs in a physical machine, load experienced by individual VNFs, other QoS parameters etc. The CMS may then analyze the received data in order to find the state of NS and take appropriate LCM actions, for example, whenever it senses high load/utilization events. The volume of data that a CMS relies on to perform management and orchestration of services and resources can be massive. A datacenter may host hundreds of thousands of servers, and each server may host tens of hundreds of VMs and thus host and manage thousands of virtualized services. The data volume can further increase in the case of multiple datacenters. The quality of the LCM decisions taken up by the CMS is highly dependent on both the quality and quantity of the monitoring data provided by the monitoring system. The quality depends on the variety of KPIs that is reported to the CMS while the quantity depends on the frequency of updates of the KPIs that the CMS retrieves.

As a result of the sheer volume of data that the CMS must monitor in order to perform MANO operations, a very high load is placed on the network resources via which such data is delivered to the CMS. Furthermore, processing such data results in a very high processing load being placed on the CMS. The CMS can also incur processing delays that may cause a sluggish reaction by the CMS to undesirable events, e.g. the resource requirements of a VNF exceeding the resources available to the VNF.

Prior art CMS have utilized three main modes for acquiring data. First, prior art CMS have utilized a periodic mode in which monitored data is delivered periodically and in which the period and type of data is specified. Second, prior art CMS have utilized a pull mode in which monitored data is provided only when it is solicited by the CMS. Third, prior art CMS have utilized a push mode in which monitored data is sent only when a specific event is triggered, for example, when a CPU load or a network load on a VM exceeds a specific threshold.

While those methods have been exhaustively explored in the literature, they present significant limitations. Periodic delivery of data is identified as the standard approach for monitoring resources statuses. However, in the case of very large datacenters it can considerably exacerbate the burden and complexity of the monitoring process. Conversely, utilizing a pull mode can solve the huge overhead issue but needs a proper design in order to provide the QoE/QoS guarantees. Last, push mode can be tuned so as to recover the system when it is close to alert-states but it may prevent an optimal allocation/distribution of VNFs/VMs within the available servers.

SUMMARY

According to an embodiment of the invention, a method is provided for reducing the monitored-data load and the processing load/delay on a cloud management system (CMS). The method includes applying a prediction process to provide predicted key performance indicator (KPI) values for a plurality of VMs managed by the CMS during a first monitoring epoch; collecting, during the first monitoring epoch, observed KPI values for the plurality of VMs managed by the CMS; assessing the accuracy of the prediction process by way of calculating, according to a reward function, reward values for the plurality of VMs based on a deviation between the observed KPI values and the predicted KPI values; calculating a monitoring frequency for collecting monitoring information during a second monitoring epoch based on the reward values; and collecting the monitoring information during the second monitoring epoch according to the calculated monitoring frequency. The monitoring information collected during the second monitoring epoch includes second epoch KPI values.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
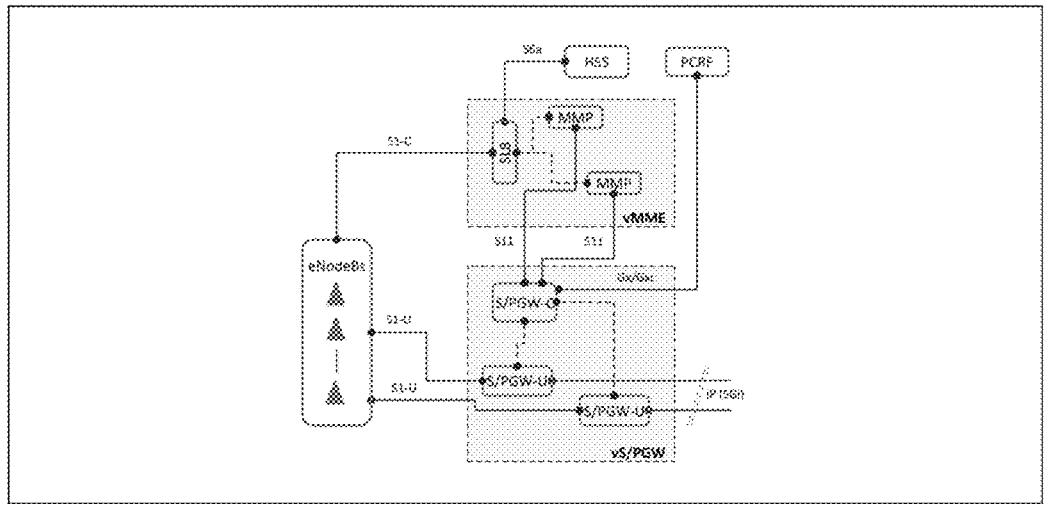
FIG. 1 depicts a virtual service composed of different virtual network function (VNF) Components (VFNC) interlinked over virtual links (VLs)

In terms of achieving high-quality MANO decisions with a reduced monitoring load, all three of the above mentioned state-of-the-art methods for acquiring the data utilized for making MANO decisions can be improved. Specifically, problems with the above mentioned state-of-art monitoring methods include but are not necessarily limited to: large loads placed on cloud infrastructure resources by the exchange of monitored data between the CMS and monitored entities throughout the cloud infrastructure; large processing loads placed on the CMS by the processing of the monitored data collected at and received from each monitored entity; large processing latency that is proportional to the volume of monitored data to be processed and analyzed by the CMS; and the sequester of a memory resources required to maintain a time series of the monitored data collected from the many monitored entities and to maintain a history of such monitored data. As the cloud infrastructure grows larger and the number of monitored entities also grows larger, such problems with the above mentioned state-of-art monitoring methods become increasingly severe.

Embodiments of the present invention provide systems and methods for improving the QoD of MANO decisions made by a CMS and for reducing the load placed on the CMS and the data delivery network by the monitoring of the virtual machines (VMs), e.g. VNFs and/or virtualized application functions (VAFs) managed by the CMS and delivering monitored data to the CMS. Reducing the monitoring load can be very complex as a result of the multi-dimensional nature of the cloud infrastructure and the variety of KPIs and resources that must be considered. In order to improve QoD and reduce the monitoring load (which can refer to the load placed on network resources utilized in acquiring monitored data and the load placed on the data delivery network by delivering the monitored data to the CMS), machine-learning techniques can be used utilized to improve the monitoring process as well as the MANO decision-making process. Embodiments of the present invention can provide, inter alia, a decrease in the monitoring load; a decrease in the processing load on the CMS, a decrease in the processing latency resulting from the processing and analysis of the monitored data by the CMS, and a decrease in the amount of memory resources required to maintain a time series of the monitored data collected from the monitored entities and to maintain a history thereof.

Embodiments of the present invention can provide for a number of improvements with respect to state-of-the-art monitoring processes. In particular, embodiments of the present invention can (i) improve the selection of relevant VM KPIs for monitoring, (ii) evaluate selected VM KPIs based on prior (e.g. learned) information (e.g. through machine learning techniques), (iii) improve placement of the VMs into available compute nodes to keep the system within stable working conditions, and (iv) derive and schedule subsequent monitoring and/or decision times based on VM behavior prediction. Embodiments of the present invention can also reduce the complexity of a centralized solution by dynamically configuring distributed monitoring agents (which can also be referred to as monitoring clients) distributed amongst the various monitored entities, e.g. VMs and the physical machines that host them.

According to embodiments of the invention, the monitoring system includes a monitoring agent for each VM and for each server in the cloud infrastructure. Each monitoring agent monitors and records the main KPIs for its respective VM or server (e.g., network, computational, and memory resource usage), and reports the recorded main KPIs back to a monitoring server at every "sample-point." In addition, each monitoring agent can also monitor, record, and report more advanced KPIs as well as other statistics based on the requirements of the CSM. The CSM can maintain a time-series of these values/statistics for each VM and server within its administrative domain. After receiving a specific set of samples, the CMS can analyze the sampled data received from the monitoring agents to determine if the monitored entities, e.g. the VMs and servers, are functioning within their desired resource limits or if one or more resource units of one or more monitored entities is being overloaded. If one or more resource units of one or more monitored entities is overloaded, the CMS can execute appropriate LCM actions to relieve the overloaded entity.

According to embodiments of the invention, methods and systems are provided that enable a CMS to determine and provide configuration parameters utilized by the monitoring system to provide the data upon which the LCM decision-making process is reliant. According to embodiments of the invention, the configuration parameters can be determined based on self-learning methods, e.g. a deep learning methods, that will provide the CSM with the necessary intelligence to determine the values of monitoring system configuration parameters in such a way so as to reduce and/or limit the exchange of monitored data traffic under normal operating circumstances, and also provide the CSM with the ability self-learn based on its analysis experience when executing LCM decisions over time based on the received monitoring data. Upon receiving data from the monitoring system, the CSM will analyze it and: (i) perform LCM operations, such as, but not limited to, migration/placement, scale-up/down/in/out, delete, instantiate; and (ii) determine monitoring system configuration parameters for one or more subsequent decision periods. Such monitoring system configuration parameters can include, e.g., a sampling frequency that determines a period of time between consecutive sample points $\Delta t_m$ and a duration of a monitoring epoch $\omega$. At the end of each monitoring epoch, an MANO decision making process can be executed by the CMS and LCM actions can be taken. Therefore, adjusting the duration of the monitoring epochs adjusts the length of time in between the decision points at which LCM actions can be taken.

In order to reduce the monitoring load, the volume of messages exchanged between a monitoring server (MS) and multiple monitoring agents (MAs) distributed among various virtual and physical resources in the datacenter(s) can be reduced by utilizing machine learning techniques and forecasting processes. Machine learning techniques and forecasting processes can enable the CMS to determine when to retrieve updated KPI information. Alternatively or additionally, the forecasting processes can also enable the CMS to configure the MAs such that the MAs push monitored information regarding the current KPIs to the CMS at specified times or at specified time intervals. In particular, the forecasting processes can provide future load values for any VM in the administrative domain of the CMS. The future load values can be expressed, e.g., as an aggregate KPI value.

In order to account for and address inaccuracies in the forecasting processes (which may, e.g., result in QoS and/or QoE violations), embodiments of the present invention can utilize reward systems. According to such reward systems, predictions provided by the forecasting processes can be weighted with a utility function that depends on a mean square error (MSE) between a value predicted by the forecasting process(es) and a corresponding actual value (i.e. a measured, or observed, value). Predictions provided by the forecasting processes can be classified as successful, e.g. if no QoS and/or QoE violations result from use of the prediction, or as unsuccessful, e.g. if QoS or QoE violations result from use of the prediction, if the error between the predicted value and a corresponding actual value exceeds a threshold, or if the prediction result in an alert-state being registered for one or more VMs or servers. Consecutive successful predictions can be used to sub-linearly increase a reward value for a computer node or VM to which the prediction pertains such that a frequency of KPI updates (which can be referred to as a sampling frequency) is decreased (thereby increasing a period of time ($\Delta t_m$) between consecutive KPI measurements (i.e. sample points) and/or such that the length of a monitoring epoch ($\omega$) is increased. On the contrary, unsuccessful predictions can cause the reward value for a computer node or VM to which the prediction pertains to be reset to zero such that a sampling frequency is reset to a default value (which can, e.g., be a maximum value) and such that the length of a monitoring epoch (ω) is reset to a default value (which can, e.g., be a minimum value). Similarly, unsuccessful predictions can merely cause the reward value for a server or VM to which the prediction pertains such that the sampling frequency is increased and/or such that the monitoring epoch duration is decreased.

According to embodiments of the invention, a frequency at which monitoring information (sample-points) is collected within a monitoring epoch can be calculated based on a reward value. In addition, durations of monitoring epochs can also be calculated based on a reward value. Other configuration parameters for the monitoring system can also be included in the calculations of such a monitoring frequency or of such a monitoring epoch duration.

According to embodiments of the present invention, systems and methods are provided in which VMs (VNFs and VAFs) are proactively placed within a cloud infrastructure. The CMS can place the VMs within the cloud infrastructure by utilizing machine learning techniques and forecasting processes. Machine learning techniques and forecasting processes can enable the CMS to determine which servers at which to place VMs such that system stability is promoted, i.e., such that further VM migrations are not required. In particular, the forecasting processes can provide future load values for any VM in the administrative domain of the CMS. The future load values can be expressed, e.g., as an aggregate KPI value. Initially, the CMS can generally place VMs onto available servers based, for example, on previous information gathered during a training phase. A VM may belong to one or more virtual service instances and the CMS is supposed to manage and orchestrate the infrastructure resources in order to ensure service integrity and to ensure that each VM is able to fulfill the operational/functional needs of the respective application/function configured inside it. In order to do that the CMS relies on the monitoring system.

At every decision point (e.g. at the end of every monitoring epoch/surveillance epoch), the CMS can perform LCM operations. The CSM can decide to reallocate one or more VMs (at every check-point) in order to keep the overall resource load (of any single server) under a certain level, or, to balance the load of all involved servers by, e.g. associating VMs heavy computational resource requirements with VMs with lighter computation resource requirements. This could be done, e.g., through the following optimization problem:

Problem Proactive-VNF-Placement $$\text{maximize} \sum_p \log \sum_i (\rho_i x_{p,i})$$

$$\text{subject to } \sum_i m_i x_{p,i} \leq M_p, \forall p \in \mathcal{P}$$

$$\sum_i \mu_i x_{p,i} \leq W_p, \forall p \in \mathcal{P}$$

$$\sum_i \eta_i x_{p,i} \leq X_p, \forall p \in \mathcal{P}$$

$$\sum_p x_{p,i} \leq 1, \forall i \in \mathcal{I};$$

where p is the index of any single server, and i is the index of any single VM, whereas $\rho_i$ is the profile value for a VM, which specifies a consolidated value for network (η), computational (μ) and storage (m) resources required by a single VM. The profile value for a VM $\rho_i$ can be a function of time, such that the anticipated resource requirements of VMs can be predicted based on, e.g., past monitoring data and forecasting processes. $M_p$, $W_p$ and $X_p$ indicate the maximum capacity of the server p in terms of network, computational and storage resources. The optimal solution of the above-described optimization problem provides a set of binary values $x_{p,i}$ equal to 1 if VM i is instantiated onto server p, or equal to 0 otherwise. In performing the VM placement/allocation, future trends of overall utilization in each VM and server can be predicted based on various usage metrics, e.g. historical as well as currently collected KPI values. Correlations between different usage metrics can be identified and exploited in order to place VMs into affinity groups.

In performing VM profiling, KPIs of any single VM can be identified and processed to provide an accurate profile of the respective VM. In this manner, an accurate profile for each VM running in the system can be provided. Machine learning techniques can be utilized, in a prediction process, to learn from previous general behaviors, to predict future trends, and to be proactive in the event of anticipated compute node resource shortages. While the number of KPIs monitored by the monitoring agents and the CSM can grow, embodiments of the present invention can provide an unsupervised binding affinity calculation to properly determine correlations among them for any specified VM. Embodiments of the invention can consider only KPIs for network load, computational burden, and storage utilization, or may consider a variety of additional or alternative KPIs. In order to allocate VMs amongst available servers in the cloud infrastructure while keeping balanced the overall load of any single compute node, affinity values for VMs can be determined by the CMS. In general, affinity values are determined that cluster VMs that have similar resource usage characteristics as indicated by measured KPIs. For example, two or more virtual machines that both exhibit high usage of computational resources, memory, and networking resources can be grouped together.

If the resource utilization of a VM differs from that predicted by its profile (i.e. a VM profile deviation occurs), an alarm can be issued. An alarm can automatically cause the CMS to increase the monitoring frequency of a VM corresponding to the alarm. Furthermore, an alarm can cause the CMS to promptly execute a corrective action to, e.g., address an unexpected critical machine resource outage. At a subsequent decision point, if no other VM profile deviation has occurred, the monitoring frequency can again be reduced and a reward function can be increased. An increase in the reward function can, in turn, increase the duration of the surveillance epoch. Conversely, if additional VM profile deviations have occurred, a new VM profiling can be performed based on the monitoring info collected during prior surveillance epochs and/or a Training Sample Set. The monitoring frequency can then be restored to a default value, and the duration of the surveillance epoch can also be reset.

According to an embodiment of the invention, a method is provided for reducing the monitored-data load and the processing load/delay on a cloud management system (CMS). The method includes applying a prediction process to provide predicted key performance indicator (KPI) values for a plurality of VMs managed by the CMS during a first monitoring epoch; collecting, during the first monitoring epoch, observed KPI values for the plurality of VMs managed by the CMS; assessing the accuracy of the prediction process by way of calculating, according to a reward function, reward values for the plurality of VMs based on a deviation between the observed KPI values and the predicted KPI values; calculating a monitoring frequency for collecting monitoring information during a second monitoring epoch based on the reward values; and collecting the monitoring information during the second monitoring epoch according to the calculated monitoring frequency. The monitoring information collected during the second monitoring epoch includes second epoch KPI values. According to another embodiment of the invention, a cloud management system (CMS) is provided including a computer readable media including instructions performing the method for reducing the monitored-data load and the processing load/delay. As is apparent to one of ordinary skill in the art in view of the description in its entirety, the first and second monitoring epochs can be any two monitoring epochs in a lengthy series of monitoring epochs and are not necessarily chronologically the first and second monitoring epochs.

The method can further include collecting, according to an initial monitoring frequency and an initial monitoring epoch duration set to operator specific default values, initial KPI values for the plurality of VMs, wherein the prediction process is a machine learning method trained by the initial KPI values. The KPIs can include network usage, computation usage, and memory usage. The reward function can depend on a mean square error between the predicted KPI values and the observed KPI values.

The method can further include calculating a second monitoring epoch duration for collecting monitoring information during the second monitoring epoch based on the reward values or a next decision time, wherein collecting the monitoring information during the second monitoring epoch according to the calculated monitoring frequency is performed for the second monitoring epoch duration. The method can also include providing VM profiles for the plurality of VMs managed by the CMS. The VM profiles can each be represented by a vector that specifies a consolidated value for storage resources, computations resources, and network resources required by a respective VM. In such case, the method can further include clustering the plurality of VM profiles into a plurality of VM affinity groups. Clustering the plurality of VM profiles into a plurality of VM affinity groups can include using an enhanced k-means algorithm to solve an optimization problem. The method can further include allocating the VMs among a plurality of compute nodes according to the VM affinity groups in order to balance a load on each of the compute nodes. Allocating the VMs among a plurality of servers can be performed according to an affinity-aided VM scheduling algorithm that takes into account general scheduling information of the VM affinity groups and applies the second epoch KPI values.

Figure 2:
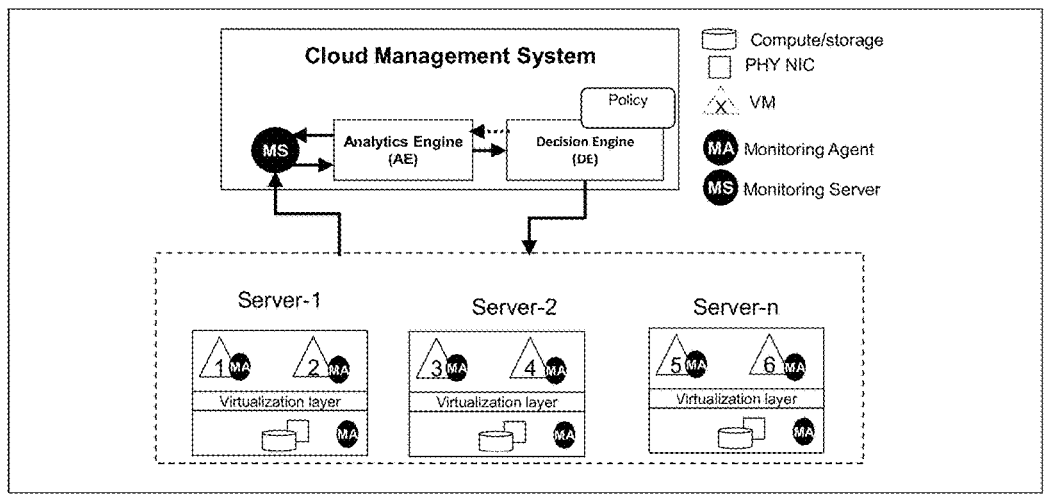
FIG. 2 depicts a cloud infrastructure according to an embodiment of the invention.

A cloud infrastructure according to an embodiment of the invention is depicted in FIG. 2. The infrastructure consists of multiple servers (which can be referred to as compute nodes), i.e. Server-1, Server-2, and Server-n, and multiple VMs deployed in each server. The physical resources of each server (e.g., compute, network, storage, and memory resources) are virtualized and allocated to VMs 1 through 6 based on the respective requirements of each VM. When configured to perform some network function, a VM can be referred to as a VNF, and when configured to perform some application function, a VM can be referred to as a virtualized application function (VAF). Network Services (NS) and Application Services (AS) are typically formed by concatenating different service components (i.e. VNFs and VAFs) that together provide a specific NS or AS. Services formed by concatenating virtualized service components can be referred to generally as virtual services. In a virtualized service instance, the service components are hosted in VMs and the respective VMs are then interconnected via VLs to provide the specific service.

In the cloud infrastructure depicted in FIG. 2, the Cloud Management System (CMS) includes a Monitoring Server (MS), an Analytics Engine (AE), and a Decision Engine (DE). The CMS is itself or can be hosted by one or more physical machines each including compute resources, storage resources, and network resources—or a component thereof (e.g. the CMS can be a VM or collection of VMs hosted by one or more physical machines). Similarly, the MS is itself or can be hosted by one or more physical machines each including compute resources, storage resources, and network resources—or a component thereof (e.g. the MS can be a VM or collection of VMs hosted by one or more physical machines). The compute resources of the physical machines include one or more processors each having one or more processor cores. The storage resources can include computer readable memory, e.g., random-access-memory (RAM) and/or cache memory. The network resources can include, e.g., a physical network interface controller. Each of the AE and the DE is a set of processor executable instructions stored at a processor readable memory, e.g. a processor readable memory of the one or more physical machines hosting the CMS, and configured to be executed by a processor, e.g. a processor or processor core of the one or more physical machines hosting the CMS.

The MS interacts with one or more Monitoring Agents (MA). The MA instances are distributed within the cloud infrastructure (specifically, at each VM and at each physical machine, i.e. server, hosting the VMs). Each MA instance is associated with an entity, i.e. a VM or server, that is to be monitored, and samples, collects, and records the relevant metrics (e.g. KPIs) and passes the monitored data over to the MS. The MS performs any necessary pre-processing and then passes the data to the Analytics Engine (AE). The AE processes the monitored data and provides an analysis of the monitored data to the DE as output. The DE receives the analysis of the monitored data from the AE and utilizes the analysis to make one or more LCM decisions. In making the LCM decisions, the AE also takes into consideration one or more prescribed policy. The DE can also inform the AE of the one or more LCM decisions, and the AE can then utilize the LCM decisions to determine appropriate configuration parameters for each of the MAs during the next round of monitoring. The MS can then configure each of the MAs by specifying relevant metrics and/or KPIs that each respective MA is to monitor and record. Such relevant metrics can include, e.g., a monitoring granularity specifying time periods at which the specified metrics/KPIs should be monitored, sampled, and recorded.

In FIG. 2, each server, i.e. Server-1, Server-2, and Server-n, is a physical machine including compute resources, storage resources, and network resources. The compute resources at each server can include one or more processors each having one or more processor cores. The storage resources at each server can include computer readable memory, e.g., random-access-memory (RAM) and/or cache memory. The network resources include a physical network interface controller (NIC). Each server additionally includes a bus that couples various system components, e.g. the processors and the computer readable memory, together. The network interface controller of each server enables it to interface with other components in the cloud infrastructure. Each VM is an isolated environment that occupies a share of the compute, storage, and network resources of one of the servers Server-1, Server-2, and Server-n. In other words, each of the servers Server-1, Server-2, and Server-n hosts isolated environments that utilize the compute resources, storage resources, and network resources thereof. Each MA is a set of processor executable instructions stored at a processor readable memory, for example a memory of one of the servers Server-1, Server-2, and Server-n, and configured to be executed by a processor or a processor core, e.g. a processor or processor core of one of the servers Server-1, Server-2, and Server-n.

Figure 3:
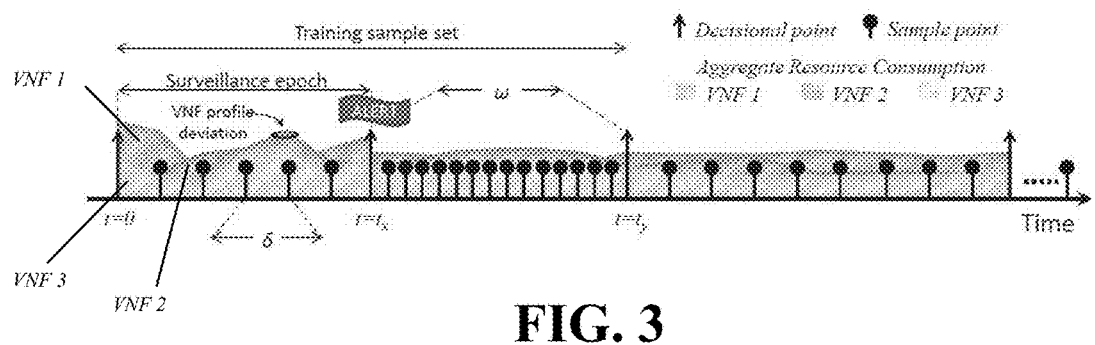
FIG. 3 illustrates a monitoring process executed according to an embodiment of the invention.

FIG. 3 illustrates a monitoring process executed according to an embodiment of the invention that can, e.g., be utilized in the cloud infrastructure depicted in FIG. 2. In the monitoring process of FIG. 3, a surveillance epoch ($\omega$) is defined as a time window during which the KPIs of each VM are monitored and recorded. In the monitoring process depicted in FIG. 3, monitoring operations are performed at different sample points that, within a particular surveillance epoch, are spaced apart by time periods ($\Delta t_m$) determined according to a monitoring frequency ($\delta$). Each surveillance epoch is delimited by decision points, which are points in time when monitored data is grouped as a data set that will be utilized by the CMS will for making an LCM decision and/or points in time at which the CMS makes LCM decisions. LCM decisions can comprise: i) changing the monitoring frequency ($\delta$), ii) changing a length of the surveillance epoch ($\omega$), and iii) placing and/or migrating VMs based on an unsupervised binding affinity calculation. If an alert message is captured at a sample point (e.g. because QoS or QoE violations occur), a decision point may be moved up in order to address unexpected network changes.

As can be seen in FIG. 3, the monitoring frequency ($\delta$) for each surveillance epoch is different. Furthermore, the length ($\omega$) of each surveillance epoch differs. The variable monitoring frequencies and surveillance epoch lengths provided by the monitoring process illustrated in FIG. 3 can be determined according to intelligent calculations, e.g. utilizing machine learning techniques, and can reduce the monitoring load placed on the resources of the cloud infrastructure as well as the processing load placed on the CMS. For example, the monitoring frequency ($\delta$) (which can also be referred to as a sampling frequency) and the lengths of the surveillance epochs (which can also be referred to as monitoring epochs) ($\omega$) can be determined based on a reward value. At time $t=t_x$, the reward value is decreased as a result of the alert and the monitoring frequency $\delta$ is increased for the subsequent surveillance epoch. At time $t=t_y$, the reward value is increased (as a result of the lack of alert since time $t=t_x$) and the monitoring frequency ($\delta$) in the subsequent surveillance epoch and the length of the subsequent surveillance epoch are both increased.

Figure 4:
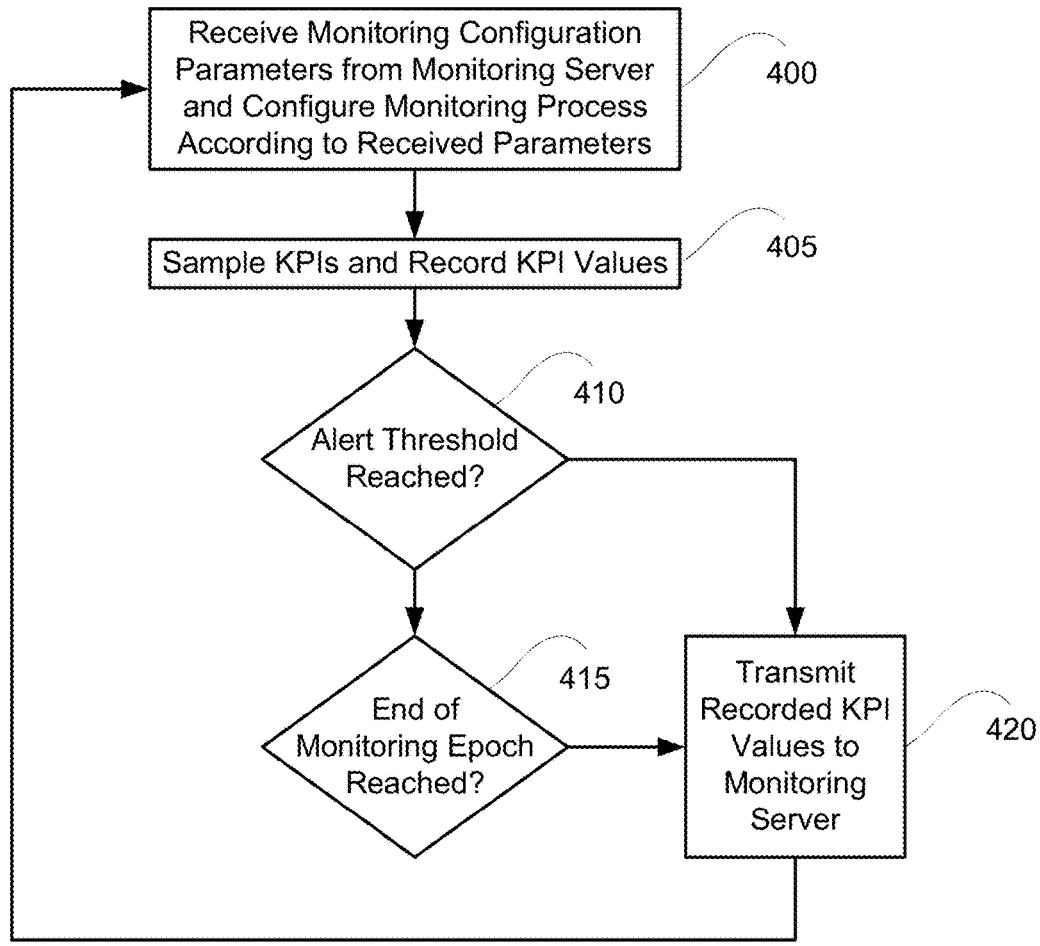
FIG. 4 is a flow chart describing a monitoring process executed by a monitoring agent according to an embodiment of the invention.

FIG. 4 is a flow chart describing a monitoring process executed by a monitoring agent according to an embodiment of the invention. The monitoring process according to FIG. 4 can be, e.g., performed in the cloud infrastructure described above in connection with FIG. 2. At 400, the monitoring agent receives monitoring parameters from a monitoring server and configures the monitoring process according to the received parameters. The parameters received by the monitoring agent can include, e.g., a monitoring frequency $\delta$, a monitoring epoch duration $\omega$, KPIs to monitor, other statistics to monitor, and alert thresholds. At 405, the monitoring agent samples KPIs (and optionally, additional statistics) pertaining to the entity it is responsible for monitoring and records KPI values (and optionally, values for the additional statistics). The KPIs are sampled at 405 according to the monitoring frequency $\delta$. For example, a sample period timer may be used to trigger the sampling of KPIs. Such a sample period timer could be initialized to zero and then be used to measure the time since the initialization until reaching a value $\Delta t_m$ determined according to the monitoring frequency $\delta$, upon which sampling of KPIs is triggered. The timer would also be reinitialized to zero upon reaching the value $\Delta t_m$ in order to measure the time until the next sample is to be taken.

At an optional step 410, the process determines whether an alert threshold has been reached. An alert threshold can be, e.g., a predetermined threshold value that a KPI value cannot be greater than or less then or a range of values that a KPI value must fall within, and can indicate, e.g., that a VM profile deviation has occurred. If an alert threshold has been reached, the process proceeds immediately to 420.

At 415, the process determines whether a monitoring epoch has ended. The process can determine that a monitoring epoch has ended by using a timer to measure time until the monitoring epoch duration $\omega$ is reached, or alternatively, by using a counter to count the number of samples that have been taken during the monitoring epoch. If the monitoring epoch has not ended, the process returns to 405. If the monitoring epoch has ended, the process proceeds to 420 where the KPI values (and possibly other data) recorded by the monitoring agent during the monitoring epoch is transmitted to the monitoring server. Alternatively, the data recorded by the monitoring agent can be transmitted to the monitoring server in a piecemeal fashion after each sample is taken (instead of being aggregated during the monitoring epoch and sent in a single transmission at the end of the monitoring epoch). After the data recorded by the monitoring agent is transmitted to the monitoring server at 420, the process returns to 400.

Figure 5:
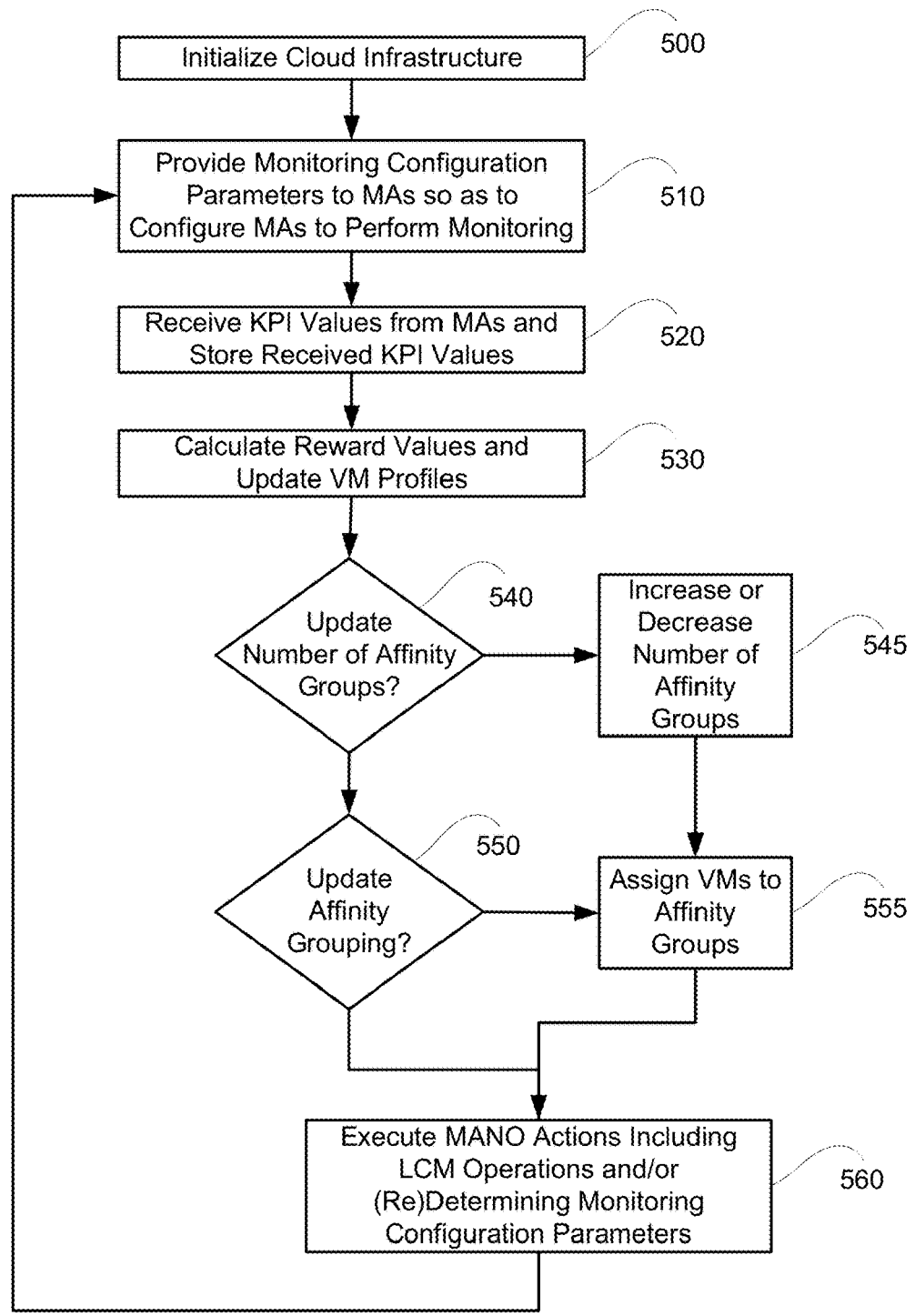
FIG. 5 is a flow chart describing a MANO process executed by a CMS according to an embodiment of the invention.

FIG. 5 is a flowchart describing a MANO process executed by a CMS according to an embodiment of the invention. The MANO process according to FIG. 5 can be, e.g., performed in the cloud infrastructure described above in connection with FIG. 2. At 500, the CMS initializes the cloud infrastructure. During the initialization of the cloud infrastructure, the CMS determines a VM profile for each VM in the cloud infrastructure and determines a number of affinity groups into which each of the VMs in the cloud infrastructure will be placed. Initially, the number of affinity groups (which can also be referred to as profiles, or clusters) is set to 2. However, during the MANO process the number of affinity groups can be increased (e.g. if no movement of VMs from one affinity group to another is detected over a threshold period of time) and can also be decreased (e.g. if too much movement of VMs from one affinity group to another is detected—which can indicate that the previous clustering was not accurate). However, the number of affinity groups is never reduced below two. Also at 500, the CMS places each of the VMs in the cloud infrastructure into an affinity group (i.e. determines affinity groups), allocates the VMs among the servers in the cloud infrastructure based on the affinity groups, and determines initial monitoring configuration parameters for the monitored entities (i.e. each of the VMs, and optionally, each of the servers). In determining the initial monitoring parameters, separate monitoring configuration parameters can be provided for each individual monitored entity, monitoring configuration parameters can be provided for classes of monitored entities, or uniform monitoring parameters can be provided for all monitored entities.

At 510, the CMS provides each individual MA at a respective individual monitored entity with the monitoring parameters corresponding to that respective monitored entity so as to configure the MAs to perform the monitoring of the monitored entities. The monitoring parameters can include, e.g., a monitoring frequency δ, a monitoring epoch duration ω, the identities of KPIs and other statistics to monitor, and alert thresholds. At 520, the CMS receives KPI values (and possibly other statistical values) from the MAs and stores the received KPI values, e.g., as a time series.

At 530, the CMS utilizes the KPI values received at 520 to calculate reward values for each VM and updates VM profiles according to the KPI values received at 520. Reward values can be calculated based on a comparison of KPI values predicted by VM profiles and the KPI values received at 520. For example, reward values can be calculated according to a utility function that depends on a mean square error (MSE) between KPI values predicted a VM profile and corresponding actual values (i.e. a measured, or observed, values) received at 520.

Figure 6:
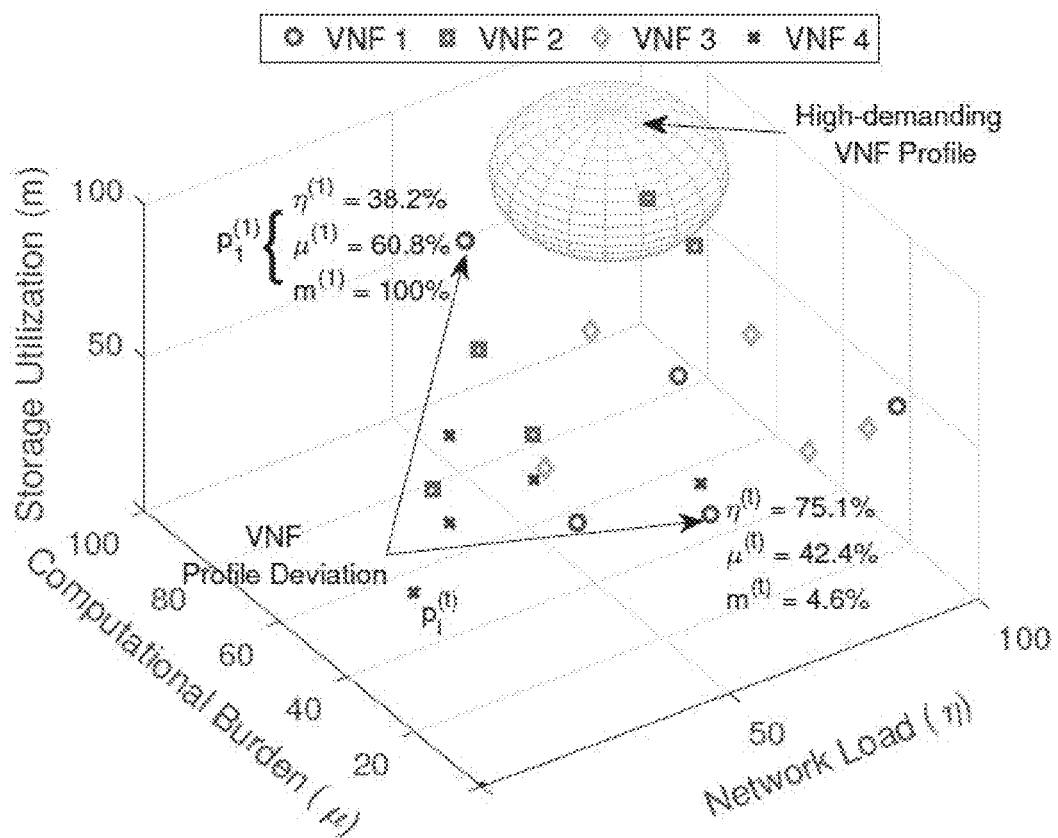
FIG. 6 depicts a characterization of different VM profiles according to an embodiment of the invention.

VM profiles can also be updated at 530 in order to account for the monitored data received at 520. FIG. 6 depicts a characterization of different VM profiles in a Z-dimensional space (in FIG. 6, Z=3) according to an embodiment of the invention. FIG. 6 illustrates different VM profiles at consecutive time-snapshots. A profile for a particular VM can be represented by a vector $p_i(t)=\{m_i(t), \mu_i(t), \eta_i(t)\}$, which specifies a consolidated value for storage resources (m), computational resources (μ), and network resources (η) required by the VM. This vector can be depicted as a single-point in a Z-dimensional space, which can be designated as S within a snapshot of time t. The values of $m_i(t)$, $\mu_i(t)$, and $\eta_i(t)$ can all be determined from a time series of KPI values that are indicative of the storage resources, computational resources, and network resources required by the corresponding VM. In updating the VM profiles at 530, the monitored data received at 520 can be added to historical data or can be used to adjust values calculated from historical data. In this manner, the past KPI values can be used by the profiling process. Values for additional dimensions can be determined and updated in an analogous manner. The Z-dimensional space can be partitioned to identify zones with specific profile properties. For instance, the yellow sphere in FIG. 6 denotes a zone wherein VMs are marked as high-demanding. The portioning of the profile space can be utilized to proactively place VMs into compute nodes in a manner that promotes system stability, i.e. in a manner that does not require further VM migrations, as described in more detail below.

At 540, the CMS determines whether it is necessary to update the number of affinity groups into which each of the VMs in the cloud infrastructure are placed. If it is necessary to update the number of affinity groups, the process proceeds to 545 where the number of affinity groups is updated. If it is not necessary to update the number of affinity groups, the process proceeds to step 550. The placing of the VMs into affinity groups is described in more detail below in connection with process step 555. The number of affinity groups can be determined based on a current system status in order to automatically cope with unexpected system changes so as to quickly react in a manner that promotes system stability. According to embodiments of the invention, a feedback-loop paradigm can be leveraged to design a controller in charge of monitoring system status and triggering a different number of VM affinity groups in response to the occurrence of certain events. In the event that the affinity grouping procedure fails, it is helpful to promptly update the number of affinity groups to handle unexpected VM profile behaviors. For example, if a VM profile deviation has occurred, it may be necessary to decrease the number of affinity groups. A VM profile deviation can be defined as an event occurring when KPI values recorded for a VM over a particular time, e.g. a surveillance epoch, (such as the KPI values received at 520 for a particular VM) place the VM into a new VM affinity group $n(t+1) \in N$ at time t+1 than the VM affinity group $n(t) \in N$ into which the VM was placed at time t based on its VM profile $p^{(t)}$, i.e. $x_{i,n(t)} \neq x_{i,n(t+1)}$. VM profile deviations can provide an indication about the accuracy of the affinity grouping process: if the grouping process fails to capture the variance of its members ($p_i$), it can be necessary to re-run the affinity grouping process to assess updated VM profiles.

Figure 7:
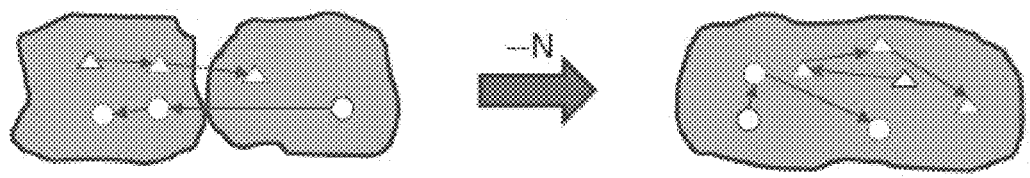
FIG. 7 illustrates a change in a the number of VM affinity groups based upon VM profile deviation occurrences.
Figure 7:
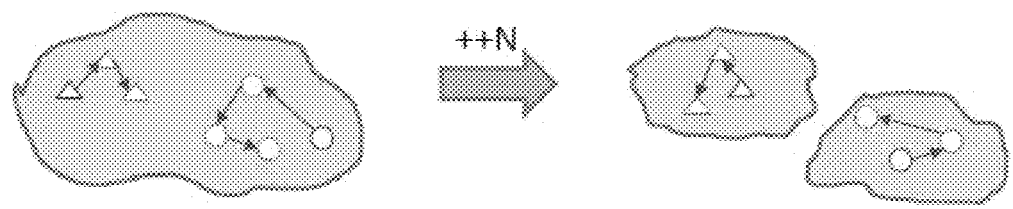

FIG. 7 shows an example of changing the number of VM affinity groups based upon VM profile deviation occurrences. FIG. 7 is an example for a 2-dimensional space, i.e., considering only 2 KPIs for any VM profile $p_i$. When a VM profile deviation occurs, an alert message is triggered and more sample points are required in the next surveillance epoch (as is described in more detail below). In response to a VM profile deviation, the number of VM affinity groups N can be reduced and a new VM affinity binding process can be executed. This will likely avoid further VM profile deviations and improve VM placement in the cloud infrastructure. Conversely, if the VM profile behavior is predictable and does not exhibit significant changes, after multiple surveillance epochs the system can automatically increase the number of VM affinity groups to be more accurate in the VM profiling process.

At 550, the CSM determines whether it is necessary to update the VM affinity groups, i.e. provide an updated VM affinity grouping. If it is not necessary to update the VM affinity groups, the process proceeds to 560. If it is necessary to update the VM affinity groups, the process proceeds to 555 where an updated VM affinity grouping is provided. At 555, given a number of VM affinity profile groups N=|N|, non-overlapping VM affinity groups n∈N are determined such that: (i) the union set of the VM affinity groups is equal to the Z-dimensional VM profile space S, (ii) each VM affinity group contains at least one VM profile $p_i$, and (iii) all VM profiles $p_i$ are placed in one VM affinity group. Each VM affinity group n∈N can be characterized by a center of gravity $c_n = \{c_{n,(1)}, c_{n,(2)}, \ldots, c_{n,(z)}\}$, where z∈Z is the spatial dimension. The center of gravity of group n is obtained as the spatial point with the least Euclidean distance from all other VM profiles $p_i$ associated with that group n. Mathematically, the optimization problem according to which VM affinity groups are determined is expressed as:

$$\text{minimize} \sum_n^{|N|} \sum_i^{|I|} x_{i,n}(\|c_n - p_i\|_2)$$

$$\text{subject to } \sum_n x_{i,n} = 1, \forall i \in I;$$

$$\sum_i^n x_{i,n} \geq 1, \forall n \in \mathcal{N};$$

$$c_n \in \mathbb{R}^{|z|};$$

$$x_{i,n} \in \{0, 1\},$$

where the outputs are $c_n$ define the spatial coordinates (in a three-dimensional space S) of each center of gravity, the binary values $x_{i,n}$ indicate whether VM i is grouped into affinity group n, $\|\cdot\|_2$ is the Euclidean distance between the center of gravity $c_n$ for affinity group n and each VM profile $p_i$. Specifically, the Euclidean distance depends on the number of KPIs (or spatial dimensions Z) considered, i.e., $\|c_n-p_i\|_2 = \sqrt{\Sigma_Z^Z(c_{n,(z)}-p_{i,(z)})^2}$.

In order to solve the optimization problem according to which VM affinity groups are determined, an enhanced k-means algorithm is used. The enhanced k-means algorithm is an iterative algorithm that randomly selects centers of gravity $c_n$ and partitions the entire Z-dimensional space based on the nearest distance rule from each of those centers $c_n$. The algorithm can then iteratively recompute the new centers of gravity based on the current group members $p_i$ and again apply the partitioning process until the centers of gravity do not change their positions. The enhanced k-means function is a k-means function that has been enhanced by the application of a regular grid on the Z-dimensional affinity space S. Mathematically, the enhanced k-means algorithm is expressed as:

1) Initialise $t = 0$ and $x_{i,n} = 0$, $\forall i \in \mathcal{I}, n \in \mathcal{N}$.

2) Initialise set $c_n^{(t)}$ by using the *VNF* profiles classification.

3) Update $\Delta^{(t)} = \frac{100}{2^{|I|}} \cdot t^{\sqrt{T}}$.

4) Apply a grid of points $w_s \in \mathcal{S}$ on the *VNF* profile space $\mathcal{S}$ such that $\|w_\xi - w_\zeta\|_2 = \Delta^{(t)}$, $\forall \xi \neq \zeta$, $(\xi, \zeta) \in \mathcal{S}$.

5) Set $x_{i,n}^{(t)} = 1 : n = \underset{n}{\operatorname{argmin}} \|c_n^{(t)} - p_i\|_2$, $\forall i \in \mathcal{I}$.

6) Calculate the center of gravity set
$$c_n^{(t+1)} = \frac{1}{\sum_i x_{i,n}^{(t)}} \sum_{i \in I} (p_i \cdot x_{i,n}^{(t)}), \forall n \in \mathcal{N}.$$

7) Update the center of gravity set based on the nearest grid point $c_n^{(t+1)} = w_s : s = \underset{s \in S}{\operatorname{argmin}} \|w_s - c_n\|_2$, $\forall n \in \mathcal{N}$.

8) If $c_n^{(t+1)} \neq c_n^{(t)}$ then increase $t = t + 1$ and jump to (3).

Points $w_s \in S$ of the grid are equally spaced from each other. The centers of gravity of each VM affinity group are then constrained to reside at specific spatial points. The granularity of such grid span, i.e., the distance $\Delta$, drives the speed of the algorithm and can be dynamically adjusted to speed up the process while keeping the accuracy of the solution. This is performed by a step-function $$\Delta^{(t)} = \frac{100}{2^t} \cdot t^{\sqrt{T}};$$

the more the steps to converge, the higher the slope of the step-function. The step-function grows slowly during the first steps (depending on the number of VM profile points I, i.e., the more the points, the slower the growth) and then, grows exponentially as the number of steps becomes consistent. This helps the system to find a very accurate solution in the first steps, while forcing the algorithm to quickly converge if the number of steps is high.

To avoid randomness effects and to make the solution more efficient, the set of centers of gravity $c_n$ can be initialized based on a VM profile classification. This classification can be performed by means of external information providing VM profile templates (in terms of expected KPIs), given a number of VM affinity groups N. For example, when N=2 VM affinity groups are defined, VM profile templates may influence the initial choice by placing the centers of gravity at $c_{n=1}=\{75\%, 75\%, 75\%\}$ for the high-demanding VM profiles and at $c_{n=2}=\{25\%, 25\%, 25\%\}$ for the low-demanding VM profiles. Such training data may be automatically updated by the infrastructure provider through a monitoring process.

Figure 10:
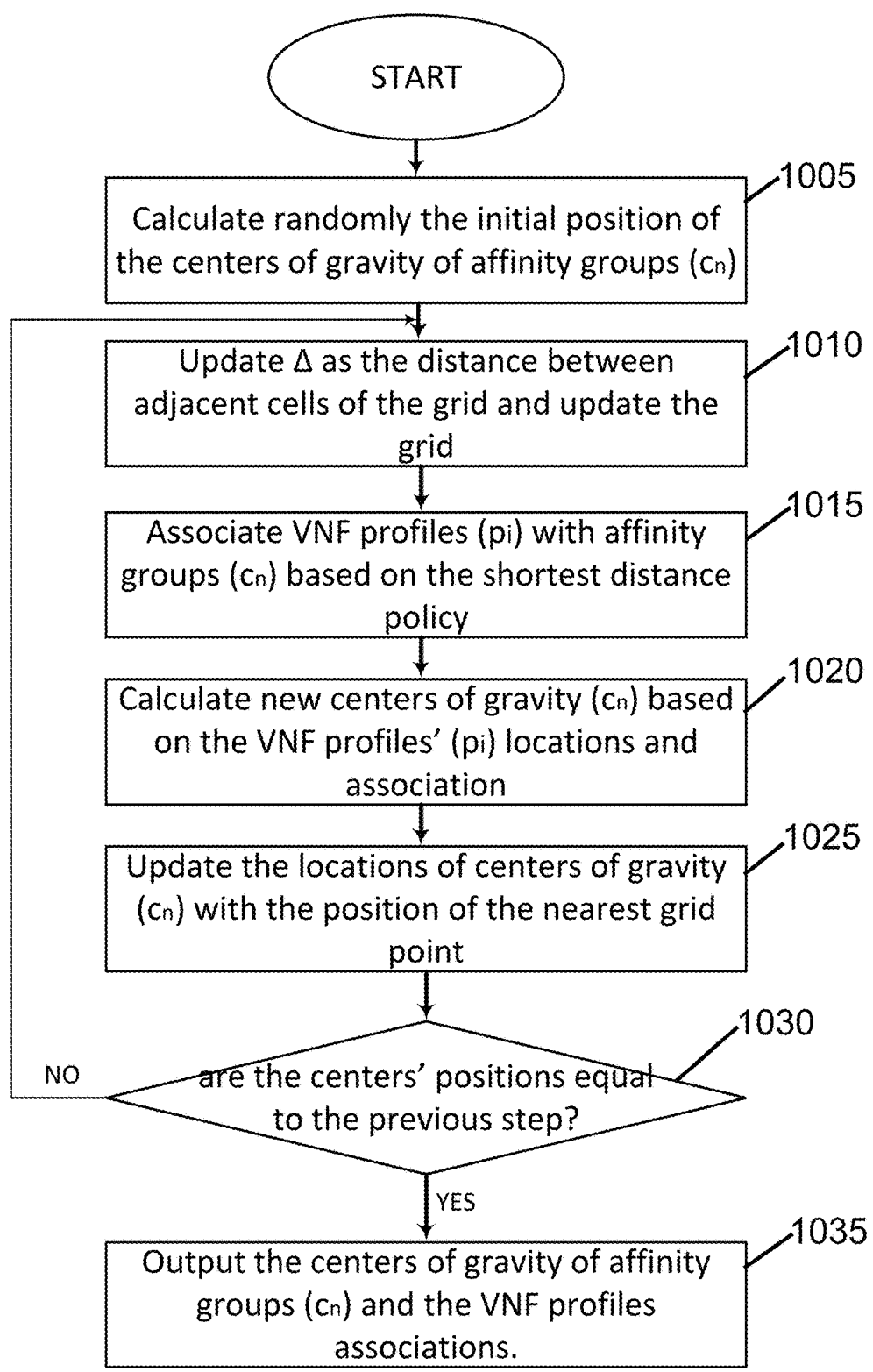
FIG. 10 is a flow chart illustrating a process for solving an optimization problem according to which VM affinity groups are determined by using an enhanced k-means algorithm.

FIG. 10 is a flow chart illustrating a process for solving an optimization problem according to which VM affinity groups are determined by using an enhanced k-means algorithm. At 1005, the process randomly calculates the initial position of the centers of gravity of affinity groups ($c_n$). At 1010, the process updates a distance between adjacent cells of the grid $\Delta$ and updates the grid. At 1015, the process associates VNF profiles ($p_i$) with affinity groups ($c_n$) based on a shortest distance policy. At 1020, the process calculates new centers of gravity ($c_n$) based on the locations of the VNF profiles ($p_i$) and the association. At 1025, the process updates the locations of the centers of gravity ($c_n$) with the position of the nearest grid point. At 1030, the process determines whether the positions of the centers of gravity are equal to the positions of the centers of gravity determined in a previous iteration (or to the randomly calculated initial position for the first iteration). If the positions of the centers of gravity are equal to the positions of the centers of gravity determined in the previous iteration, the process proceeds to 1035; otherwise the process returns to 1010. At 1035, the process outputs the centers of gravity of the affinity groups ($c_n$) and the VNF profiles associations.

At 560, the process executes MANO actions. The MANO actions executed at 560 can include performing LCM operations, such as, but not limited to, migration/placement, scaling-up/down/in/out, deletion, and instantiation of VMs. The MANO actions executed at 560 can also include determining monitoring system configuration parameters for subsequent monitoring operations. Such monitoring system configuration parameters can include, e.g., the monitoring frequency $\delta$, the monitoring epoch duration $\omega$, the identities of KPIs and other statistics to monitor, and alert thresholds. After completing the MANO actions at 560, the process returns to 510.

LCM operations, such as migration/placement, scaling-up/down/in/out, deletion, and instantiation of VMs, are performed at 560 according to the affinity groups determined at 555. The CSM can decide to reallocate one or more VMs (at every check-point) in order to keep the overall resource load (of any single server) under a certain level, or, to balance the load of all involved servers by associating heavy-computational VMs with light-weight VM instances. This is performed according to the following Proactive-VM-Placement optimization problem:

$$\text{maximize} \sum_{l \in \mathcal{L}} \log \sum_{n \in \mathcal{N}} (\|c_n\| y_{l,n})$$

$$\text{subject to} \sum_{n \in \mathcal{N}} c_n y_{l,n} \leq P_l, \forall l \in \mathcal{L};$$

$$\sum_{l \in \mathcal{L}} y_{l,n} \leq 1, \forall n \in \mathcal{N};$$

$$y_{l,n} \in \{0, 1\},$$

where $\|\cdot\|$ is the L-1 Norm of a vector, $1 \in L$ is an available compute node in the system, $P_1=\{P_{1(z)}\}$ is the set of maximum resource availability for compute node 1 in terms of KPI (z) whereas $y_{1,n}$ is the binary value indicating whether the VM class n is placed into compute node 1. The log operator is needed to provide fairness between different compute node loads. A solution to the Proactive-VM-Placement optimization problem can be found within an affordable time as the number of variables, i.e., the number of VM affinity groups N, is limited.

The solution optimality of the Proactive-VM-Placement optimization problem can be guaranteed if each VM profile accurately follows the center of gravity of its assigned affinity group. In other words, the solution optimally is maintained if the bias (variance) from the mean value of the affinity group is very low. Conversely, if the VM profile values move away from the average properties of their group, the scheduling solution might fail leading to unstable system states and service disruptions.

In order to limit such unstable system states and service disruptions, an Affinity-aided VM Scheduling (AaVS) algorithm that takes into account the general scheduling information of the VM affinity groups but applies current KPI values of each VM to correctly balance the load on each of the servers in the cloud infrastructure. The AaVS algorithm consists of the following:

1) Initialise $v_i = \max_{t \in w}(\|p_i^{(t)} - c_n\|_2 : x_{i,n} = 1, \forall i \in \mathcal{I}$.

2) Initialise set $\mathcal{H}_l = \emptyset, \forall l \in \mathcal{L}$, $\mathcal{B}_n = \emptyset, \forall n \in \mathcal{N}, \mathcal{F} = \emptyset$ and $l = 0$.

3) Place $i \to \mathcal{B}_n, \forall n \in \mathcal{N}$ if $x_{i,n} = 1$.

4) Sort $\mathcal{B}_n$, $\forall n \in \mathcal{N}$ according to $v_i$ in a decreasing order.

5) For every n, take the first i from $\mathcal{B}_n$ and Place $i \to \mathcal{F}$ if $y_{l,n} = 1$. If i does not fit, Take the next i in $\mathcal{B}_n$.

6) Remove all i placed in $\mathcal{F}$ from $\mathcal{B}_n$. Update $\mathcal{H}_l \leftarrow \mathcal{F}$.

7) If there is any $n : \mathcal{B}_n \neq \emptyset$ then Increase $l = l + 1$, Update $\mathcal{F} = \emptyset$ and go to (5).

The AaVS algorithm relies on the First Fit Decreasing (FFD) algorithm suggested for bin backing problems. The VM profile variance is calculated in line 1 as $v_i = \max \|p_i^{(t)} - c_n\|_2$ for $t \in \omega$ along the last (at least 2) epochs $\omega$. Based on variance calculated in line 1, each VM profile value is sorted within its affinity group in line 4, leaving at the first position the VM profile which has experienced much variations (and might be considered as unstable). It is desirable to first place the VM profile which might cause (in the worst case) unexpected compute node resource outages. The other VM profiles are iteratively scheduled based on the Proactive-VM-Placement optimization problem, i.e., based on $y_{1,n}$. Upon all VMs having been scheduled into compute nodes 1, the algorithm ends.

Assuming that the compute nodes deployment is over-provisioning, The Proactive-VM-Placement optimization problem can reasonably balance the load of compute nodes and keep them in a stable state without dangerously approaching a saturation point. Nonetheless, to avoid unexpected compute node resources saturation, $P_1$ values in the Proactive-VM-Placement optimization problem can be properly chosen by the infrastructure provider.

Figure 11:
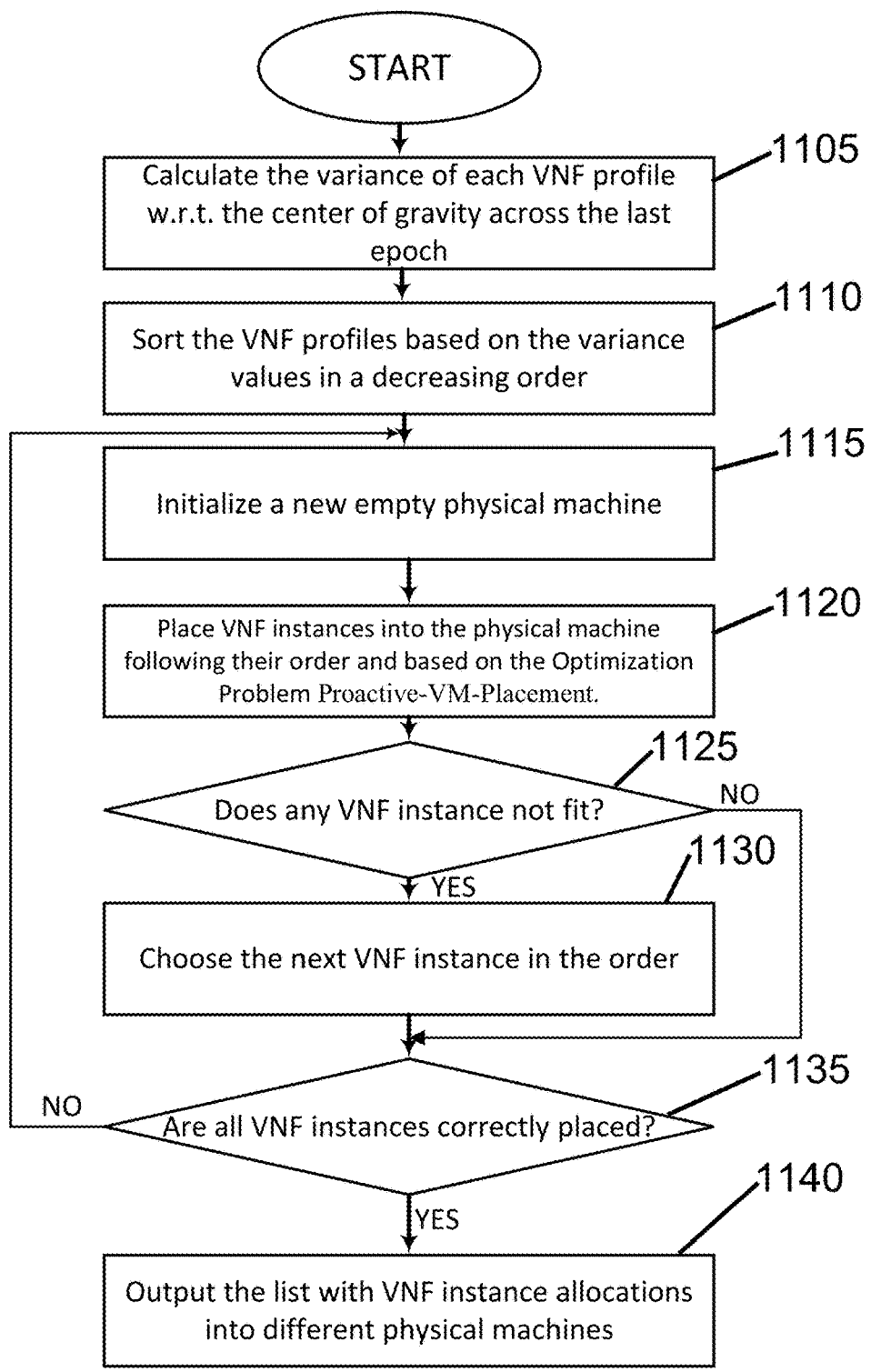
FIG. 11 is a flowchart illustrating a process for correctly balancing the load on each of the servers in the cloud infrastructure using the AaVS algorithm.

FIG. 11 is a flowchart illustrating a process for correctly balancing the load on each of the servers in the cloud infrastructure using the AaVS algorithm. At 1105, the process calculates a variance of each VNF profile with respect to the center of gravity across a prior epoch. At 1110, the process sorts the VNF profiles based on the variance values determined at 1105 in a decreasing order. At 1115, the process initializes a new empty physical machine. At 1120, the process places VNF instances into the physical machine following their order and based on the Proactive-VM-Placement optimization problem. At 1125, the process determines whether any VNF instance does not fit. If no VNF instance does not fit, the process proceeds directly to 1135; if a VNF instance does not fit, the process chooses the next VNF instance in the order that does fit at 1130 and then proceeds to 1135. At 1135, the process determines whether all VNF instances are correctly placed. If all VNF instances are correctly placed, the process proceeds to 1140 where it outputs a list with VNF instance allocations into difference physical machines; otherwise the process returns to 1115.

Determining monitoring system configuration parameters for subsequent monitoring operations at 560 can adjust the length of the surveillance epochs, and therefore, the period of time between consecutive decisional points. The decision points play a key-role because they are the times at which the system can re-define the affinity groups and improve the accuracy of VM placement in order to provide improved QoD and to reduce the number of LCM operations anticipated in the near future due. Furthermore, the complexity and overhead of the monitoring system are strictly related to the frequency of the decision points, i.e. the surveillance epoch length $\omega$. An optimal trade-off must be found based on the current system conditions as well as previous observations. Embodiments of the invention provide an adaptive scheme to keep track of previous alert triggers while increasing the surveillance epoch when the stability of the system can be preserved for a longer time period.

Determining monitoring system configuration parameters for subsequent monitoring operations at 560 is performed according to an adaptive scheme that is based on a machine-learning algorithm, namely Q-Learning. The adaptive scheme learns from previous actions and obtained rewards in order to take decisions in the future that pursue the reward maximization. In the following, the index of surveillance epoch as well as the decision point at the end of a surveillance epoch can be denoted by $\tau \in T$; the state space $\pi \in \Pi$ denotes the number of VM profile deviations j experienced at the previous decision point, i.e., $\pi\tau = j(\tau-1)$. At every decision point $\tau$, the system can take actions $a\tau$ that increase or decrease the length of the next surveillance epoch $\omega(\tau+1)$, i.e., $a\tau = \{+k \cdot o\}$, where o is defined as the least step size. After taking an action $a\tau$, the system will be rewarded based on a reward function $$R(\pi, a) = \frac{\omega^{(\tau)}}{j_\tau^\beta}$$

where $\omega(\tau)$ is the length of the surveillance epoch between two decision points $\tau-1$ and $\tau$.

The adaptive scheme balances increasing the length of the surveillance epoch $\omega$ with reducing the number of VM profile deviations that occur as such VM profile deviations may compromise the stability of the system. $\beta \leq 1$ is a tunable parameter that can be adjusted by the infrastructure provider to have a slower (faster) changing of the surveillance epoch at expense of less (more) scheduling optimality.

At 560, a Q-table collecting the reward coming from each possible pair (π, a) can be constructed based on the following equation:

$$Q(\pi,a)=(1-\alpha)Q(\pi,a)+\alpha[R(\pi\tau,a\tau,\pi\tau+1)+\psi q \text{ max}],$$

where q=max Q(πτ+1,aτ+1), and R(πτ,aτ,πτ+1) is the reward obtained from action aτ leading to state πτ+1. α and ψ are the learning rate and the discount rate, respectively. The former balances the stored information (in the Q-table) against the current observed values. It is usually set differently per state and evolves over time, i.e., $$\alpha_{\pi,a}^{\tau} = \frac{0.5}{i(\pi, a)},$$

where i(π,a) is the number of times the state π has been explored by time τ. The latter give a lesser weight to old information, which could become incorrect. This is useful when the stationary and ergodic assumption on the VM statistical properties could not be taken for very long periods. When a new action must be taken, it can be selected randomly (with probability φ≤1) among available actions a∈A or it can select the one maximizing the reward (with probability 1-φ) based on the information stored in the Q-table, i.e., a=arg max Q(π, a) for $\alpha^{\tau}$.

With reference to the above steps of FIG. 5 above, it should be noted a fine granular monitoring control can be provided by deriving separate monitoring configuration parameters for individual monitored entities.

Figure 8:
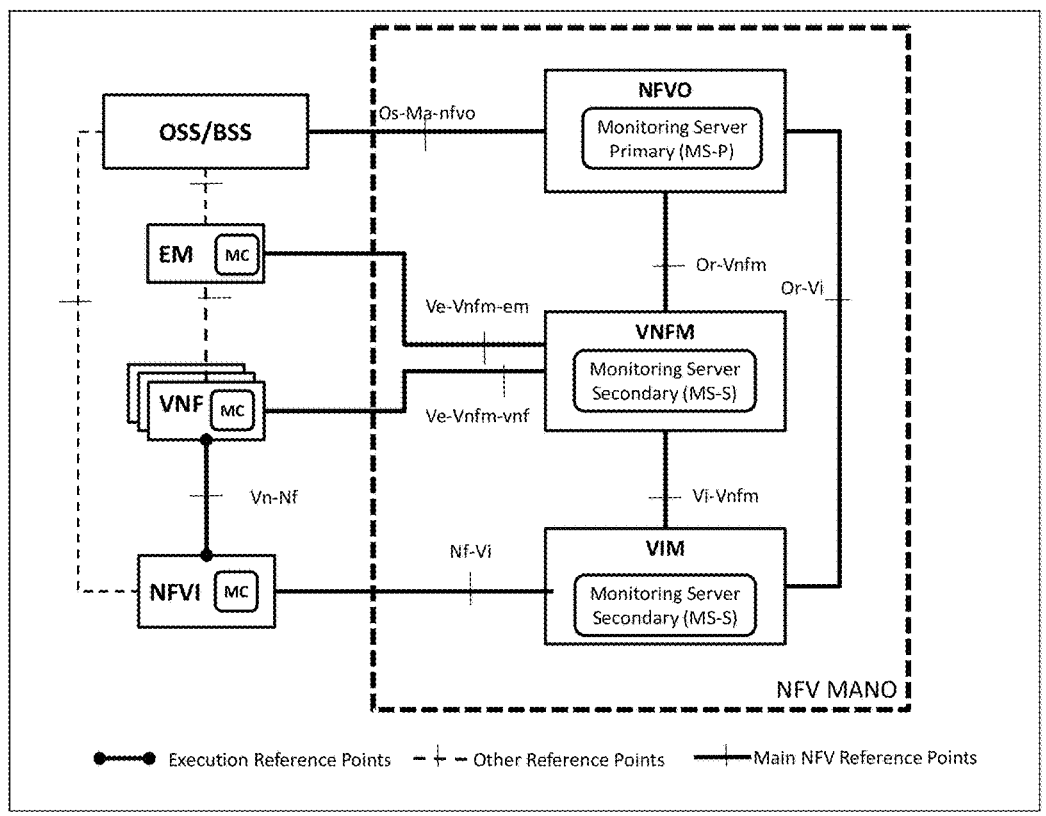
FIG. 8 illustrates an ETSI NFV MANO system according to an embodiment of the invention.

A European Telecommunications Standards Institute (ETSI) NFV MANO system according to an embodiment of the invention is depicted in FIG. 8. The ETSI NFV MANO framework is an example of a CMS. The NFV MANO system is composed of three main functional components namely the Virtualized Infrastructure Manager (VIM), VNF Manager (VNFM), and NFV Orchestrator (NFVO) as shown in FIG. 8. The ETSI NFV MANO system is designed to manage and orchestrate virtualized resources in an NFV Infrastructure (NFVI) such as virtualized compute, network, storage, memory, etc. via the VIM. It also manages the individual VNFs that are deployed over the NFVI via the VNFM. The NFVO is designed to perform resource orchestration and service orchestration, where the service is a composite Network Service (NS) that is formed by the concatenation of multiple relevant VNFs. In other words the VIM, VNFM, and NFVO in FIG. 8 constitute the CMS. The VIM, VNFM, and NFVO monitor their respective layers for performance and fault management and take relevant LCM decisions as per the logic local to the respective functional component. A monitoring entity i.e., MANO Monitor, with which all of the three MANO functional elements will interact can be provided. Two layers of monitoring for performance/fault management can be identified; Layer-1 is for the monitoring of the virtualized infrastructure and resources, while Layer-2 is for the monitoring of the MANO functional blocks themselves. According to the embodiment of the invention depicted in FIG. 8, the MS is integrated within each MANO functional component while the monitoring clients (MCs) are deployed within the virtualized infrastructure/resources (i.e., NFVI, VNF) and could also be deployed within an Element Manager (EM), if present, where the EM is responsible for the FCAPS (Fault, Configuration, Accounting, Performance, Security) management functionality for a VNF. It should be noted that the choice of deploying a MC in the VNF or EM or both is implementation dependent and this invention does not preclude any deployment choice. However, it should be clear that in case when a VNF is without an EM then the MC needs to be deployed inside the VNF. As explained above, the MCs are configurable by the MS. The key difference is that due to the distribution of the MS inside the MANO functional blocks, the MS within the NFVO is the primary MS (MS-P), while the MS inside each of the VIM, VNFM and EM are secondary MSs (MS-S). The MS-Ss can independently monitor, collect, analyze data from the functional block respective layer. For example, the MS-S within the VNFM will be able to deploy and configure MC instances inside the VNF instance(s), and/or their respective EM if present, and will also independently collect and locally analyze monitored data from these MCs. Based on the analysis of the monitored data, the VNFM can take VNF specific LCM decisions as per the policy/decision logic local to the VNFM. Similarly the MS-S inside the VIM will deploy and configure MC within the virtualized/non-virtualized infrastructure resources (e.g., compute, network, memory, storage) and monitor and manage them as per its local policy/decision logic.

However, the LCM decisions taken by the VIM and/or VNFM must be validated by the NFVO as the latter has an overview of the overall NS that is composed of several VNFs managed by possibly different VNFMs and deployed over possibly different VIM platforms.

Owing to the level and centrality of the NFVO in the LCM decision process; the MS-P is integrated within NFVO. The MS-P does not deploy/configure/monitor any specific MCs but it monitors and configures the MS-S instances in VNFM and VIM. The MS-P may override any configuration parameter within the MS-S instances at any time. Methods according to embodiments of the invention can run, at least in part, inside the MS-P. The MS-P can, based on the feedback it receives from MS-S, (re)compute and (re)adjust the values of δ and ω for the specific MS-S instances. Based on these values, the MS-S will (re)configure the MC instances within their respective monitoring domain. The MS-P can also configure the MS-S with the KPIs to monitor and can change the configuration parameters of the MS-S any time. The MS-P, based on the inputs received from the MS-S will forward them to the analytics engine (AE). The AE after analyzing the data send the results to the decision engine which will take appropriate decision on LCM, recompute the necessary configuration parameters for the MS-S instances and push them over the respective standard reference points i.e., Or-Vi and Or-VNFM reference points. The AE and DE components and their interrelationship with themselves and the MS-P is similar to that shown in FIG. 2. However, the AE and DE components have not been depicted in FIG. 6 for the sake of clarity. Methods according to embodiments of the present invention can be executed, at least in part, in the MS-P and/or the AE. The AE can also provide recommended configurations parameters to the MS-S.

Figure 9:
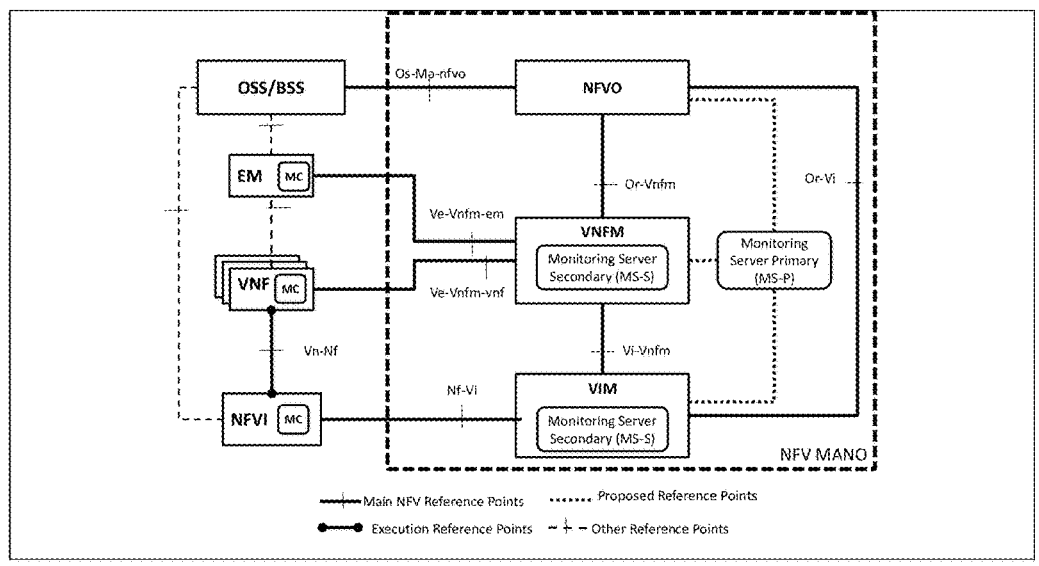
FIG. 9 illustrates an alternative ETSI NFV MANO system according to an embodiment of the invention.

An alternative ETSI NFV MANO system according to an embodiment of the invention is depicted in FIG. 9. In this embodiment, the MS-P is a central entity that interacts with the MS-S located in VNFM and VIM functional blocks. The NFVO does not carry a MS-S as it will interact with the external MS-P. Methods according to embodiments of the invention, e.g. the method described in FIG. 5, can be executed, at least in part, by the MS-P. The MS-P can compute the relevant configuration parameters for the MS-C, which in turn will configure the MCs of their respective domains. In this case the NFVO, which carries the AE and the DE (see FIG. 2) will inform the MS-P of its LCM decision and also the identities of the VNFs and NSs that has been affected, and based on this information the MS-P will (re)calculate the relevant configuration parameters and push then to the MS-Ss so that they can configure the MCs within their respective layer. It is also possible that the MS-P may derive separate configuration values for the MS-S. This will make the MC at the NFVI and VNF level to use different monitoring configuration.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for reducing the monitored-data load and the processing load/delay on a cloud management system (CMS), the method comprising:
    applying a prediction process to provide predicted key performance indicator (KPI) values for a plurality of VMs managed by the CMS during a first monitoring epoch;
    collecting, during the first monitoring epoch, observed KPI values for the plurality of VMs managed by the CMS;
    assessing the accuracy of the prediction process by way of calculating, according to a reward function, reward values for the plurality of VMs based on a deviation between the observed KPI values and the predicted KPI values;
    calculating a monitoring frequency for collecting monitoring information during a second monitoring epoch based on the reward values; and
    collecting the monitoring information during the second monitoring epoch according to the calculated monitoring frequency,
    wherein the monitoring information collected during the second monitoring epoch includes second epoch KPI values.

2. The method of claim 1, further comprising collecting, according to an initial monitoring frequency and an initial monitoring epoch duration set to operator specific default values, initial KPI values for the plurality of VMs.

3. The method of claim 2, wherein the prediction process is a machine learning method trained by the initial KPI values.

4. The method of claim 1, wherein the KPIs include network usage, computation usage, and memory usage.

5. The method of claim 1 further comprising calculating a second monitoring epoch duration for collecting monitoring information during the second monitoring epoch based on the reward values or a next decision time,
    wherein collecting the monitoring information during the second monitoring epoch according to the calculated monitoring frequency is performed for the second monitoring epoch duration.

6. The method of claim 1, wherein the reward function depends on a mean square error between the predicted KPI values and the observed KPI values.

7. The method of claim 1, further comprising providing VM profiles for the plurality of VMs managed by the CMS.

8. The method of claim 7, wherein the VM profiles are each represented by a vector that specifies a consolidated value for storage resources, computations resources, and network resources required by a respective VM.

9. The method of claim 7, further comprising clustering the plurality of VM profiles into a plurality of VM affinity groups.

10. The method of claim 9, wherein clustering the plurality of VM profiles into a plurality of VM affinity groups includes using an enhanced k-means algorithm to solve an optimization problem.

11. The method of claim 10, further comprising allocating the VMs among a plurality of compute nodes according to the VM affinity groups in order to balance a load on each of the compute nodes.

12. The method of claim 11, wherein allocating the VMs among a plurality of servers is performed according to an affinity-aided VM scheduling algorithm that takes into account general scheduling information of the VM affinity groups and applies the second epoch KPI values.

13. The method of claim 9, further comprising increasing the number of affinity groups in response to a sub-threshold number of movements of VMs from one affinity group to another during a period of time.

14. The method of claim 9, further comprising decreasing the number of affinity groups in response more than a threshold number of movements of VMs from one affinity group to another during a period of time.

15. A cloud management system (CMS) comprising computer readable media including instructions performing a method for reducing the monitored-data load and the processing load/delay, the method comprising:
    applying a prediction process to provide predicted key performance indicator (KPI) values for a plurality of VMs managed by the CMS during a first monitoring epoch;
    collecting, during the first monitoring epoch, observed KPI values for the plurality of VMs managed by the CMS;
    assessing the accuracy of the prediction process by way of calculating, according to a reward function, reward values for the plurality of VMs based on a deviation between the observed KPI values and the predicted KPI values; and
    calculating a monitoring frequency for collecting monitoring information during a second monitoring epoch based on the reward values; and collecting the monitoring information during the second monitoring epoch according to the calculated monitoring frequency,
wherein the monitoring information collected during the second monitoring epoch includes second epoch KPI values.

* * * * *